United States Patent [19]

Erlich

[11] Patent Number: 5,377,564
[45] Date of Patent: Jan. 3, 1995

[54] TOOL FOR STRIPPING SHEATH FROM FIBER OPTIC CONDUCTOR

[75] Inventor: Ron Erlich, Bridgeport, Conn.

[73] Assignee: The Trustees of Columbia University in the City of New York, New York, N.Y.

[21] Appl. No.: 135,012

[22] Filed: Oct. 12, 1993

[51] Int. Cl.⁶ ............................................. H02G 1/12
[52] U.S. Cl. ..................................... 81/9.44; 30/91.2
[58] Field of Search ................. 81/9.4, 9.44; 30/90.1, 30/91.2

[56] References Cited

U.S. PATENT DOCUMENTS

| | | |
|---|---|---|
| 2,894,424 | 7/1959 | Vaughan, Jr. . |
| 2,932,224 | 4/1960 | Peed, Jr. et al. . |
| 2,955,494 | 10/1960 | Shader et al. . |
| 3,796,115 | 3/1974 | Dane . |
| 4,748,871 | 6/1988 | Zdzislaw . |
| 4,986,148 | 1/1991 | Krampe . |
| 5,046,252 | 9/1991 | Ayuta et al. . |
| 5,140,751 | 8/1992 | Faust . |
| 5,172,620 | 12/1992 | Faust . |

Primary Examiner—James G. Smith
Attorney, Agent, or Firm—Brumbaugh, Graves, Donohue & Raymond

[57] ABSTRACT

A stripping tool, particularly for fiber optic conductors, has rigid jaws and lever handles extending in opposite directions from a pivot point, the jaws carrying blades having parallel opposed edges, one or both of which may be sharpened, which contact a conductor placed between them. A spring arranged to normally urge the opposed blade edges toward one another determines the pressure they exert on the sheath material. The blades are separated, to receive conductors of various sizes, by an adjusting screw arranged to force the lever handles toward one another, and the blades away from one another, when it is rotated in one direction against the bias of the spring, and to allow the spring to force the lever handles away from one another, and the blades toward one another, when it is rotated in the opposite direction. The small size of the tool, coupled with the fact that the pressure applied to the conductor does not depend on thumb conductor damage.

6 Claims, 1 Drawing Sheet

TOOL FOR STRIPPING SHEATH FROM FIBER OPTIC CONDUCTOR

BACKGROUND OF THE INVENTION

This invention relates to a stripping tool for removing a sheath or covering from a conductor and, more particularly, to a tool for removing the sheath from a fiber optic conductor.

Fiber optic cables are assembled to form a fiber bundle which, to protect it against mechanical damage, is introduced into a flexible metal or synthetic plastic hose. The installation of such cables requires splicing together of cable sections which, in turn, involves cutting the hose and splitting the fiber bundle to expose the individual glass fibers, which have a sheath or covering that must be removed preparatory to splicing to another fiber. More particularly, an optical coupler is used to splice two optical fibers together, and preparatory to inserting their ends into the coupler a predetermined length of the sheath of each is removed and the fiber itself cut off squarely. The sheath typically is a silicon coating having a thickness on the order of 0.025 mm and therefore is very fragile, the fibers themselves are fragile and easily damaged, and often the stripping and splicing must be done in confined quarters. Accordingly, there is a need for a small, easily manipulable tool which is suitable for stripping the fragile sheath from an optical fiber without nicking or otherwise mechanically damaging the fiber.

Among the known tools heretofore used for this purpose is the hand-held stripping tool described in U.S. Pat. No. 4,748,871. The disclosed tool has two like components pivoted together between their ends so as to provide a pair of rigid lever handles on one side of the pivot and a pair of jaws on the other side of the pivot; a portion of each jaw near the pivot is flexible and resilient. Each jaw is provided with a blade which project toward one another and include faces which are parallel to each other and contact the sheath when the lever handles are pressed together. Should excess pressure be applied when closing the blades on the sheath, the flexible portion of the jaws flex thereby to minimize the risk of fiber damage. The tool effectively self-adjusts to the sheath characteristics, a sheath that severs easily will do so under light pressure before much flexure of the jaws has occurred, while one which is tougher will require greater pressure and flexing.

From the analogous art of wire strippers, U.S. Pat. No. 2,894,424 discloses a tool consisting of two resilient bars connected together at one end and adapted to be compressed toward one another. A pair of transverse cutter blades are fixed to the free ends of the bars, the blades having coacting V-shaped cutting edges for straddling the sheathing of a wire. In use, the bars are compressed and the tool rotated about the axis of the wire to cut a ring transversely in the sheathing to separate a portion of the sheathing by pulling the blades along the wire. An adjustable stop mounted on one of the bars and disposed between the pair of bars limits the compression of the bars so as to prevent the blades from cutting into the conductor. This stripper does not self-adjust to the diameter of the optical fiber, but must be set by the user, which can lead to application of excess pressure and breakage if used to remove sheath material from a fragile glass fiber. Moreover, the V-shaped cutting edges do not allow for sideways deformation of the sheathing material as the bars are compressed toward one another, which would increase the risk of breakage if used to strip an optical fiber.

The object of the present invention is to provide an improved tool for stripping the sheath from an optical fiber without nicking or otherwise mechanically damaging the fiber core.

Another object of the invention is to provide such a tool which is small enough to be conveniently used in close quarters.

Still another object of the invention is to provide such a tool which is relatively easy and inexpensive to manufacture.

SUMMARY OF THE INVENTION

In accordance with the invention, a stripper tool suitable for removing the sheath from a fiber-optic conductor includes two members pivoted together between their ends so as to provide a pair of lever handles at one side of the pivot and a pair of jaws on the other side of the pivot. A blade is secured to the extremity of each jaw and are disposed in a plane generally perpendicular to the long axes of the jaws and have sharpened edges which are parallel to each other and urged toward one another by a spring disposed between the two members. An adjusting screw extending through an opening in one of the lever handles and threadably engaging the other, when turned in a first direction forces the lever handles toward one another, against the bias of the spring, to cause widening of the space between the opposed blades, and when turned in the opposite direction allows the spring to force the lever handles away from one another and at the same time narrow the space between the blades.

Preparatory to stripping the sheathing from an optical fiber, the adjusting screw is turned a sufficient number of turns in the first direction to separate the blades to permit the sheathed fiber to be inserted between the sharpened edges. While holding the sheathed fiber in one hand and the tool in the other, the tool is positioned inwardly from the end of the fiber at a point therealong from which the sheathing is to be stripped, with the blade edges disposed perpendicularly to the fiber. The adjusting screw is then turned in the opposite direction, allowing the lever handles to spread apart and causing the blades to close and engage the outer surface of the sheath. Once the blades have come in contact with the sheath further turning of the screw does not affect the spacing of the blades nor the pressure they exert on the sheath; that is, the pressure applied to the sheath is determined solely by the characteristics of the biasing spring, being sufficient that the blades slightly deform the sheath material but do not sever it. The tool is then rotated about the axis of the fiber, causing the blades to score a ring transversely in the sheath without actually severing it, such that when the tool is pulled along the fiber the blades strip a portion of the sheath from the fiber of a length determined by the location of the scored ring. The spacing between the blades may be adjusted to accommodate sheathed fibers varying widely in diameter, and since the final blade separation is determined by the outside diameter and toughness of the sheath, use of the tool is not limited by the diameter of either the sheath or the fiber.

BRIEF DESCRIPTION OF THE DRAWINGS

Other objects, features and advantages of the invention will become apparent, and its construction and operation better understood, from reading the following detailed description and referring to the accompanying drawings, in which.

DESCRIPTION OF THE PREFERRED EMBODIMENT

Figure 1:
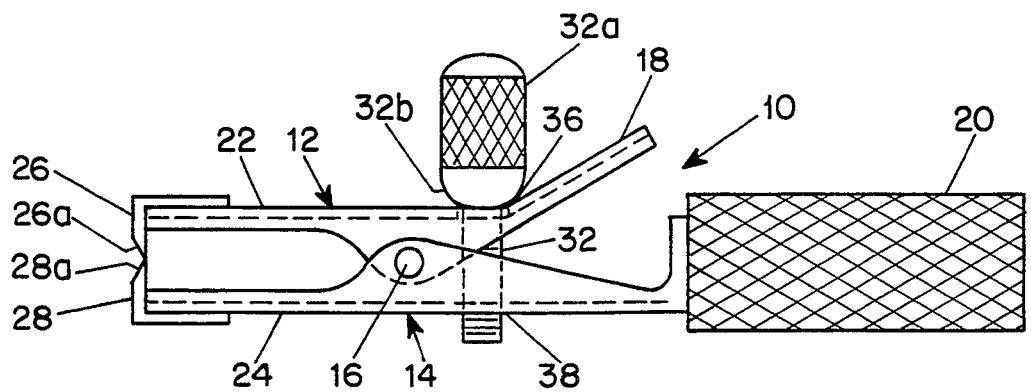
FIG. 1 is a side elevation view of a stripping tool constructed according to the invention, with its blades fully closed.
Figure 2:
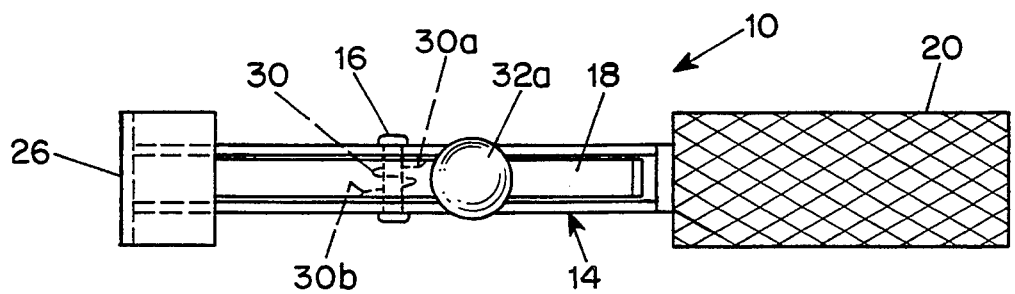
FIG. 2 is a top plan view of FIG. 1.
Figure 3:
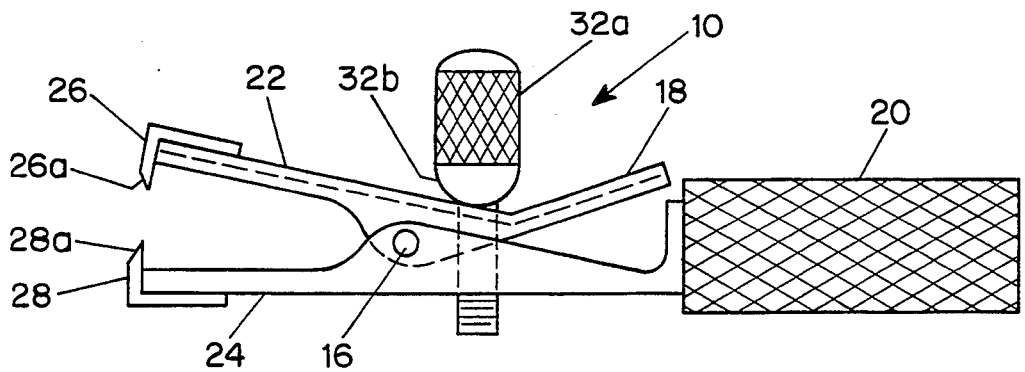
FIG. 3 is an elevation view of the tool with its blades fully opened.
Figure 4:
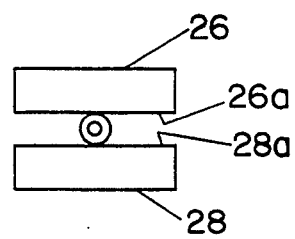
FIG. 4 is an end view of the tool, viewed from the left in FIG. 1, with its blades separated to receive a sheathed optical fiber.

Referring to the drawings, a tool for stripping the sheath from a fiber-optic conductor incorporating the features of this invention is shown greatly enlarged and indicated generally by the numeral 10. The tool incorporates as its main structural components two elongate members 12 and 14 pivoted together between their ends with a pivot pin 16 so as to provide a pair of lever handles 18 and 20 at one side of the pivot and a pair of jaws 22 and 24 on the other side of the pivot. Lever handle 20 is longer than handle 18 and has a knurled cylindrical contour to facilitate rotation of the tool by two-finger manipulation of the handle. The members 12 and 14 both have "U"-shaped cross-sections to make them stiff and rigid, member 12 being slightly narrower than and fitting within member 14. A pair of thin, flat blades 26 and 28, preferably formed of hardened steel, are secured to the ends of jaws 22 and 24, respectively, and are disposed in a plane perpendicular to the long axis of the tool. As seen in FIG. 3, each blade may be rectangular in shape and have sharpened edges 26a and 28a, respectively, which are parallel to each other.

A coil spring 30 wound around pivot pin 16 has extensions 30a and 30b which engage the interior surfaces of members 12 and 14 respectively, and normally urge the sharpened edges of the blades into contact with each other. The blades are separated, and the spacing therebetween is set as desired, with a finger-manipulable adjusting screw 32 which extends through an opening 36 formed in lever handle 18 and threadably engages a threaded hole 38 formed in lever handle 20. The upper end 32a of screw 32 is knurled and sized to be conveniently manipulated with the thumb and forefinger, and at its lower end has a rounded bearing surface 32b which engages the outer surface of lever handle 18. Turning the screw clockwise draws the lever handles 18 and 20 toward one another, against the bias of spring 30, causing blades 26 and 28 to separate by an amount determined by the number of turns of the screw. The preferably fine screw thread and the fact that the force of the spring opposes that of the screw, makes it possible precisely to adjust the spacing between the blades to accept a variety of sizes of sheathed optical fibers. When screw 32 is turned counterclockwise, spring 30 is allowed to force lever handles 18 and 20 away from one another, with an attendant narrowing of the space between the sharpened edges 26a and 28a of the blades.

In use, adjusting screw 32 is manipulated to separate blades 26 and 28 sufficiently to accept therebetween the end of a sheathed fiber to be stripped and, then, while holding the fiber in one hand and the tool in the other, the tool is positioned inwardly from the end to a point along the length of the fiber from which the sheath is to be stripped, with the blade edges oriented perpendicularly to the fiber. Then, using two fingers of the hand in which the tool is held, the screw 32 is turned in the direction which allows the lever handles to spread apart, and the blades to close and contact the fiber-optic sheath. The torsion of spring 30 is such that once the blades contact the sheath, further turning of the screw is without effect and the torsion of spring 30 alone determines the pressure applied to the sheath. The force exerted by the sharpened edges of the blades is sufficient to slightly deform, but not to sever, the sheath material. The tool is then rotated, by finger manipulation of lever handle 20, causing the blades cooperatively to score a ring transversely in the sheath material without actually severing it. The tool is then pulled toward the end of the fiber thereby removing the sheath and leaving a predetermined length of bare optical fiber.

Figure 5A:
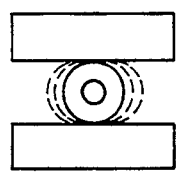
FIGS. 5A and 5B are diagrams useful in comparing the operation of the present tool with prior art stripping tools.
Figure 5B:
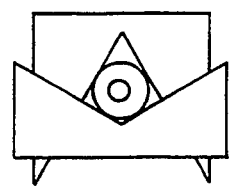

The described construction and operation of the stripping tool provides significant benefits over known fiber-optics stripping tools. In order to prevent breakage of the glass fiber it is imperative that minimal force be used in removing the sheath. The use of a spring to exert pressure on the sheath is more delicate than prior art tools which use hand force to cut the fiber sheath and eliminates the human judgment factor in selecting the proper pressure. Additionally, the parallel arrangement of the blades 26 and 28, and the fact that their edges are uninterrupted, allows the sheathing material to spread outward as depicted in FIG. 5A, thereby minimizing breakage of the fiber core. In comparison, the V-shaped blades of the tool shown in U.S. Pat. No. 2,894,424, or the blades with fine parallel slits in the stripping tool described in U.S. Pat. No. 4,748,871, do not allow for sideways expansion but, instead, the sheath is confined as depicted in FIG. 5B. As a consequence, the sheath material is forced inwardly and often causes friction between the sheath and the core,, the least amount of which can break the fiber core.

Because the stripping tool is small, typically having an overall length of about two inches, and is much lighter than other known strippers, the pressure it exerts on the core is minimal and the likelihood of breakage therefore reduced. Also, because of its small size and mode of operation, the rotational diameter of the tool during the scoring operation is very small and, moreover, the rotation can be done with only two fingers. In contrast, known strippers require much larger diameter rotation around the core, exerting more force on the core and increasing the likelihood of breakage.

While the construction and operation of a preferred embodiment of the invention has been described, since modifications and changes will readily occur to those skilled in the art, it is to be understood that the invention is not to be limited to the exact construction shown and described but shall include all such modifications and equivalents as fall within the scope of the appended claims.

I claim:

1. A stripping tool for removing the sheath from a fiber optic conductor comprising:

two members pivoted together between their ends by a pivot pin so as to provide a pair of stiff lever handles on one side of the pivot and a pair of stiff jaws on the other side of the pivot, each of said jaws being provided with a blade, said blades having opposed parallel edges at least one of which is sharpened;

spring means disposed between said two members for normally urging said jaws and the opposed edges of said blades toward one another; and adjusting screw means coupled to said lever handles which when turned in one direction forces said lever handles toward one another, against the bias of said spring means, for causing separation of the opposed edges of said blades to permit insertion of a fiber optic conductor therebetween, and which when turned in the opposite direction allows said spring means to urge said lever handles apart and to urge said opposed blades into engagement with the sheath of said fiber optic conductor with a force determined only by said spring means.

2. A tool as claimed in claim 1, wherein said spring means is a coil spring wound around said pivot pin and having extensions which engage interior surfaces of said members at opposite sides of said pivot pin.

3. A tool as claimed in claim 1, wherein the opposed edges of said blades are both sharpened.

4. A tool as claimed in claim 1, wherein said spring means is adapted to cause said blades to exert a force on the sheath of said fiber optic conductor sufficient to slightly deform but not to sever the sheath material.

5. A tool as claimed in claim 1, wherein said blades are made of a hard material and the opposed edges of both blades are sharpened.

6. A tool as claimed in claim 1, wherein said blades are disposed in a plane which is substantially perpendicular to the axes of said jaws.

* * * * *

UNITED STATES PATENT AND TRADEMARK OFFICE
CERTIFICATE OF CORRECTION

PATENT NO. : 5,377,564
DATED : January 3, 1995
INVENTOR(S) : Ron Erlich

It is certified that error appears in the above-indentified patent and that said Letters Patent is hereby corrected as shown below:

Col. 1, before line 5, insert -- The United States Government has certain rights in this invention pursuant to award CDR-881111 by the National Science Foundation. --

Signed and Sealed this

Second Day of January, 1996

*Attest:*

BRUCE LEHMAN

*Attesting Officer*  *Commissioner of Patents and Trademarks*